(12) United States Patent
Yu et al.

(10) Patent No.: US 8,939,653 B2
(45) Date of Patent: Jan. 27, 2015

(54) OPTICAL FIBER CONNECTOR

(75) Inventors: Tai-Cherng Yu, New Taipei (TW);
Cheng-Sheng Shih, New Taipei (TW);
I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 729 days.

(21) Appl. No.: 13/087,394

(22) Filed: Apr. 15, 2011

(65) Prior Publication Data

US 2012/0148197 A1  Jun. 14, 2012

(30) Foreign Application Priority Data

Dec. 14, 2010  (TW) ................................ 99143589 A

(51) Int. Cl.
*G02B 6/38* (2006.01)
*G02B 6/32* (2006.01)

(52) U.S. Cl.
CPC ............... *G02B 6/3853* (2013.01); *G02B 6/32* (2013.01); *G02B 6/3885* (2013.01)
USPC ................... 385/59; 385/61; 385/71; 385/77; 385/79; 385/52

(58) Field of Classification Search
None
See application file for complete search history.

(56) References Cited

U.S. PATENT DOCUMENTS

| 8,491,197 B2* | 7/2013 | Tamura et al. ................ 385/61 |
| 2008/0144999 A1* | 6/2008 | Takeda et al. ................ 385/51 |
| 2009/0252455 A1* | 10/2009 | Ohta et al. ................... 385/42 |
| 2011/0026882 A1* | 2/2011 | Budd et al. ................... 385/52 |
| 2013/0011100 A1* | 1/2013 | Shiraishi ....................... 385/77 |

FOREIGN PATENT DOCUMENTS

| CN | 1661402 A | 8/2005 |
| CN | 1779494 A | 5/2006 |
| CN | 101206283 A | 6/2008 |
| CN | 101221268 A | 7/2008 |
| TW | 536641 B | 6/2006 |

* cited by examiner

*Primary Examiner* — Hemang Sanghavi
(74) *Attorney, Agent, or Firm* — Novak Druce Connolly Bove + Quigg LLP

(57) ABSTRACT

An optical fiber connector includes a main body, a number of lens portions, a number of restricting members, and a number of optical fibers. The main body includes a first side surface and a second side surface opposite to the first side surface. The main body defines a cavity between the first and second side surfaces, and a number of accommodating holes extending through the first side surface and communicating with the cavity. The lens portions are positioned on the second side surface, and each lens portion is coaxial with a corresponding accommodating hole. The restricting members are arranged in the cavity. The optical fibers are fixed in the accommodating holes. Each optical fiber is restricted by a corresponding restricting member and an end of each optical fiber is fixed at the focal plane of a corresponding lens portion.

8 Claims, 2 Drawing Sheets

OPTICAL FIBER CONNECTOR

BACKGROUND

1. Technical Field

The present disclosure relates to an optical fiber connector.

2. Description of Related Art

An optical fiber connector generally includes a female connector and a male connector each having a main body, at least two optical lens portions protruding from the main body, and at least two optical fibers. The main body defines a plurality of accommodating holes, such as blind holes. Each of the at least two optical fibers is fittingly fixed in a corresponding blind hole for optically coupling with a corresponding lens portion.

Since typical mold cores for forming the accommodating holes are usually thin and long, it is difficult to precisely fabricate the blind hole using injection molding. Whether each lens portion is precisely coaxial with the corresponding optical fiber plays a vital role in transmission loss. Therefore, it is desired to provide an optical fiber connector exhibiting low transmission loss.

BRIEF DESCRIPTION OF THE DRAWING

Many aspects of the present disclosure can be better understood with reference to the following drawing. The components in the drawings are not necessarily drawn to scale, the emphasis instead being placed upon clearly illustrating the principles of the present disclosure.

DETAILED DESCRIPTION

Figure 1:
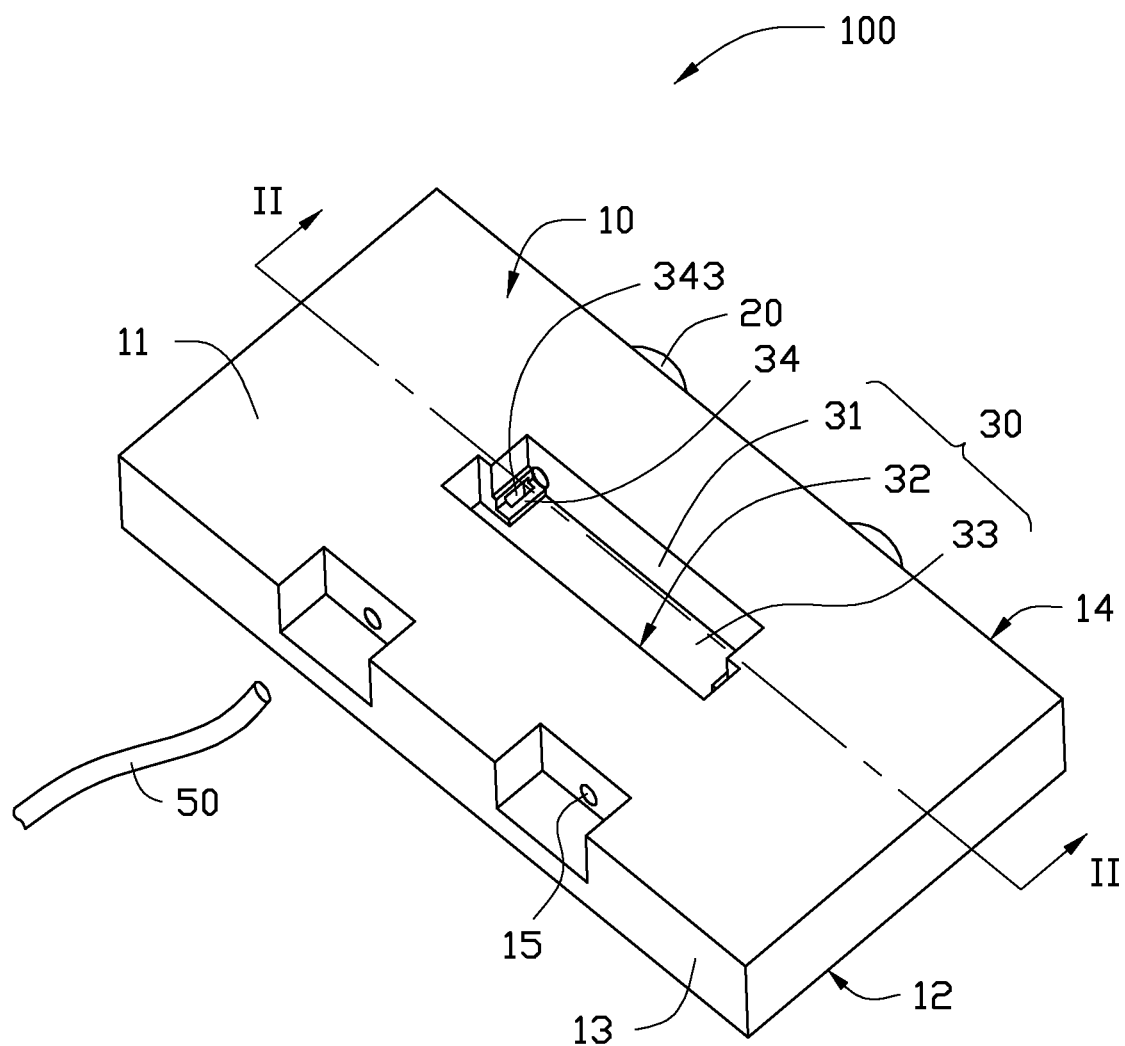
FIG. 1 shows an isometric, disassembled view of an optical fiber connector according to an exemplary embodiment of the present disclosure.
Figure 2:
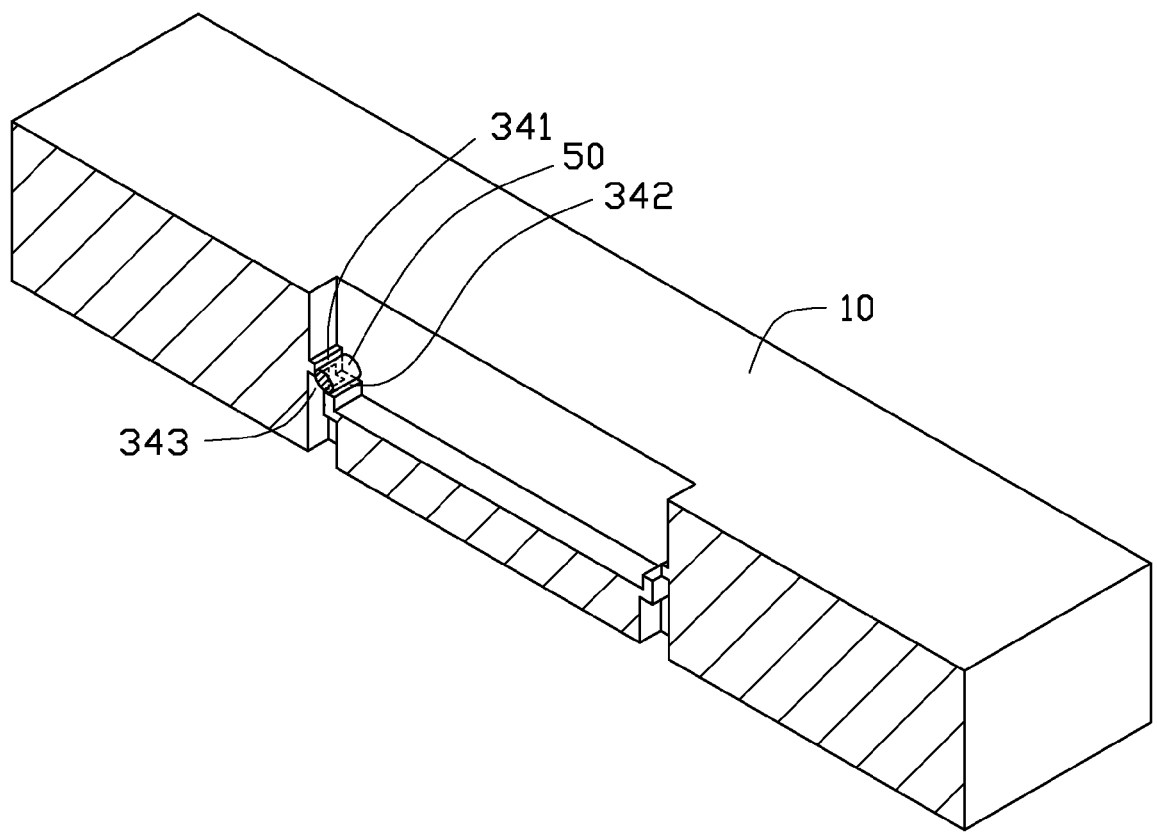
FIG. 2 shows a cross-sectional, assembled view of the optical fiber connector, taken along line II-II of FIG. 1.

Referring to the FIGS. 1 and 2, an optical fiber connector 100 provided in an exemplary embodiment includes a transparent main body 10, two lens portion 20, two restricting members 34, and optical fibers 50.

The main body 10 is substantially rectangular, and includes a top surface 11, a bottom surface 12, a first side surface 13 and a second side surface 14 opposite to the first side surface 13. In addition, the main body 10 defines a cavity 30 from the top surface 11 toward an inner portion thereof, thereby obtaining a first inner surface 31, a second inner surface 32, and a third inner surface 33 in the cavity 30. The first inner surface 31 is substantially parallel to the second side surface 14, and opposite to the second inner surface 32. The second inner surface 32 is substantially parallel to the first side surface 13. The third inner surface 33 is substantially parallel to the bottom surface 12 and interconnects the first inner surface 31 and the second inner surface 32. The main body 10 further defines two accommodating holes 15, each extending through the first side surface 13, the second inner surface 32, the first inner surface 31, and the second side surface 14. The accommodating holes 15 communicate with the cavity 30 and are parallel to each other. In other embodiments, the main body 10 defines more accommodating holes 15.

Each lens portion 20 protrudes from the second side surface 14, and coaxial with the corresponding accommodating hole 15. A focal plane of the lens portion 20 overlaps the first inner surface 31. In alternate embodiments, the first inner surface 31 is spaced from and parallel to the focal plane.

The two restricting members 34 are mounted on the third inner surface 33 with an end of each one contacting the first inner surface 31. Each restricting member 34 is aligned with a corresponding accommodating hole 15, and includes a first restricting surface 341 and a second restricting surface 342 intersecting with the first restricting surface 341 at a right angle. Additionally, the first and second restricting surfaces 341, 342 are each perpendicular to the first inner surface 31. A through hole 343 extending through the bottom surface 12 and the second restricting surface 342 is defined for subsequent assembly convenience. In another embodiment, the restricting members 34 are formed with the main body 10 in one piece, and the first restricting surface 341 intersects the second restricting surface 342 at an acute angle. In yet another embodiment, the restricting members 34 are omitted, and the end of the optical fibers are directly restricted by the first inner surface 31.

The optical fiber 50 is accommodated in the accommodating hole 15, an end portion of the fiber 50 is fixed on the second restricting surface 342 of the corresponding restricting member 34 and contacts the first inner surface 31. Due to the first inner surface 31 overlapping the focal plane of the lens portion 20, the optical fiber 50 is precisely positioned at the focal plane of the lens portion 20. Furthermore, due to existence of the cavity 30, shorter mold cores can be employed for fabricating the accommodating holes 15, resulting in more precise fabrication.

In assembly, the end portion of the optical fiber 50 can be firstly fixed on the second restricting surface 342 by a vacuum suction force produced in the through hole 343, and then adhered to the restricting member 34 with solidifiable glue. In the present embodiment, the glue is ultraviolet light curable.

The described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. An optical fiber connector, comprising:
   a main body comprising a first side surface and a second side surface opposite to the first side surface, the main body defining a cavity between the first and the second surfaces and a plurality of accommodating holes, each accommodating hole extending through the first side surface and communicating with the cavity;
   a plurality of lens portions positioned on the second surface, each lens portion coaxial with a corresponding accommodating hole;
   a plurality of restricting members arranged in the cavity; and
   a plurality of optical fibers fixed in the accommodating holes, each optical fiber restricted by a corresponding restricting member, and an end of each optical fiber positioned at the focal plane of a corresponding lens portion; wherein the main body further comprises a bottom surface interconnecting with the first and second side surfaces, and each restricting member defines a through hole extending through the bottom surface.

2. The optical fiber connector of claim 1, wherein the restricting members are formed with the main body in one piece.

3. The optical fiber connector of claim 1, wherein an inner surface of the cavity overlaps a focal plane of each lens portion, and the end of each optical fiber contacts the inner surface.

4. The optical fiber connector of claim 3, wherein the restricting members contact the inner surface.

5. The optical fiber connector of claim 1, wherein each restricting member comprises a first restricting surface and a second restricting surface, and the first and second restricting surfaces intersect with each other and contact a corresponding optical fiber.

6. The optical fiber connector of claim 1, wherein the cavity is filled with solidifiable glue.

7. An optical fiber connector, comprising:
- a main body comprising a first side surface and a second side surface opposite to the first side surface, the main body defining a cavity between the first and second side surfaces and a plurality of accommodating holes, each accommodating hole extending through the first side surface and communicating with the cavity, the cavity comprising an inner surface;
- a plurality of lens portions positioned on the second side surface, each lens portion coaxial with a corresponding accommodating holes, a focal plane of each lens portion overlapping the inner surface; and
- a plurality of optical fibers fixed in the accommodating holes, an end of each optical fiber contacting the inner surface such that each optical fiber is optically coaxial with a corresponding lens portion; wherein the main body further comprises a bottom surface and further defines a through hole in the cavity, the through hole passes through the bottom surface.

8. The optical fiber connector of claim 7, wherein the cavity is filled with solidifiable glue.

\* \* \* \* \*